Patented Feb. 3, 1931

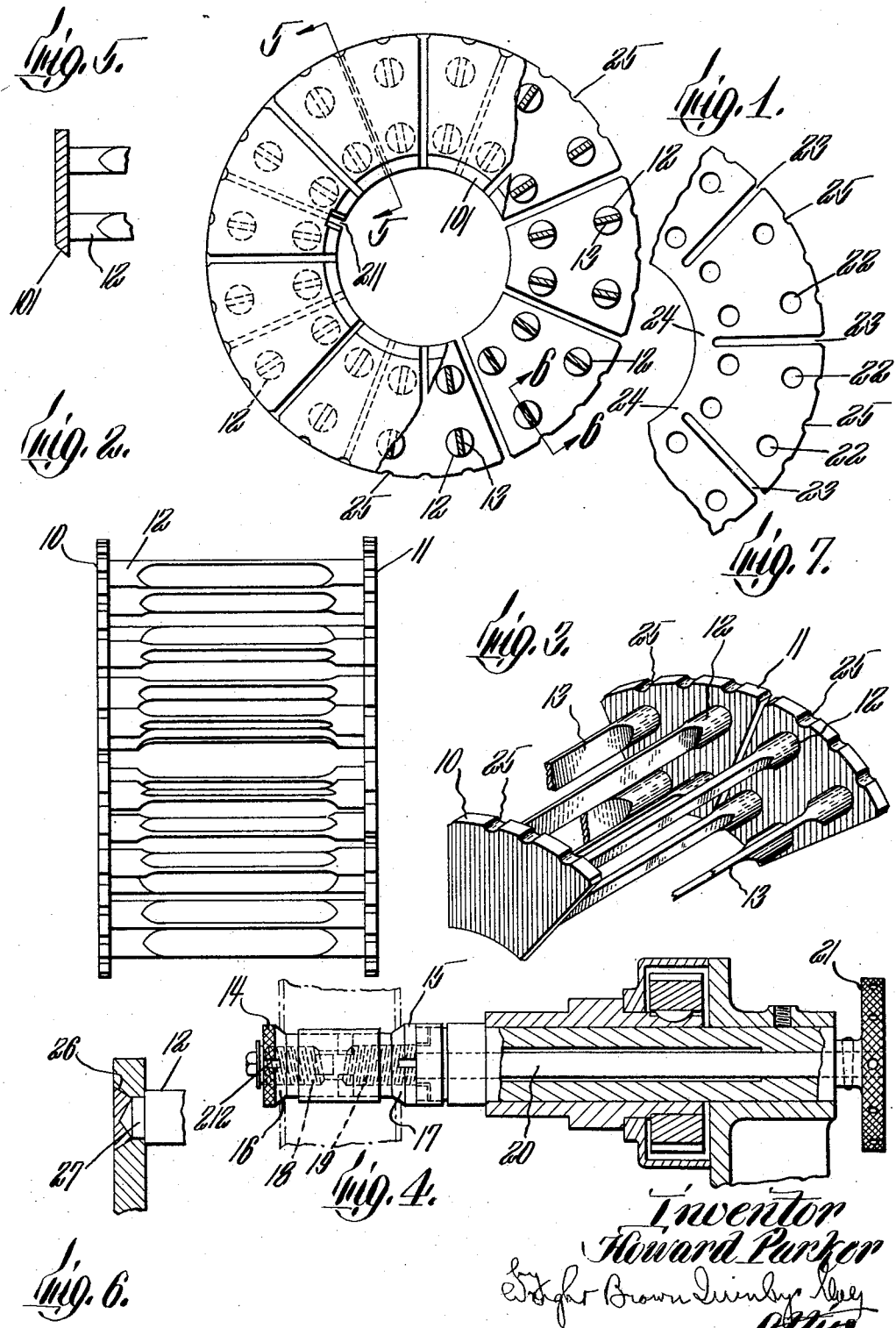

1,790,833

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

EXPANSIBLE CHUCK

Application filed September 21, 1926. Serial No. 136,786.

My invention relates to expansible bodies constructed of inextensible material, and has special reference to metal chucks or mandrels such as are adapted to enter a hollow core or tube and to be expanded into gripping engagement therewith. It is an object of my invention to provide a chuck which is comparatively light and strong, which can be easily and cheaply made, and which will have a relatively large range of expansion.

Many novel and advantageous features of construction will be apparent to one skilled in the art from the disclosures in the following specification and on the drawing, of which:—

Figure 1 is an end elevation of a chuck illustrating my invention, part of one end being broken away.

Figure 2 is a side elevation of the same.

Figure 3 is a perspective view of a portion of the chuck.

Figure 4 is a side elevation partly in section of a holding and expanding device for the chuck.

Figures 5 and 6 are fragmentary detailed sections on the lines 5—5 and 6—6 of Figure 1.

Figure 7 is a fragmentary elevation of an end plate in the course of manufacture.

Referring to the drawing in detail, the form of chuck may take any desired shape to fit into the article to be held. As illustrated on the drawing, the chuck may be in the general form of a cylinder, and may comprise a pair of end plates 10, 11, connected by a number of longitudinally extending rods 12. The plates 10 and 11 have the form of centrally perforated plates or disks and may be stamped from suitable sheet metal. These end pieces in the finished chuck are divided into sectors, the sectors of the opposite end plates being equal in number. The rods 12 connecting the end plates 10, 11 are preferably disposed about the axis of the chuck, their arrangement following one or more closed paths or circuits around the axis, the shape of these paths depending somewhat on the shape of the articles for which the chuck is made. The rods in the particular chuck illustrated on the drawing are arranged in two circles. The sectors of the end members 10 and 11 are staggered relatively to each other and the rods 12 are so arranged that in each circle thereof two rods will be secured to each sector of each end piece. As a result of the staggering of the end pieces, the two rods of each circle, which are secured to the same sector of one end piece, will extend to different adjacent sectors of the opposite end piece, as clearly illustrated in Figure 3. By this arrangement, the sectors are resiliently held in proper relation to each other, but are capable of being spread so as to enlarge the circumference of their outer margins. In order to spread the sectors and thus to expand the chuck, the rods 12 must yield, either pivotally at the junctures of the ends of the rods with the sectors, or by a lateral flexing. Since in the form of chuck illustrated the ends of the rods are firmly fixed in the sectors, the spreading of the sectors is necessarily accompanied by a lateral flexing of the rods. The rods are therefore preferably of flexible material but sufficiently stiff to hold the chuck normally in shape. The material should also be resilient so that when the expanding force is removed from the chuck, it will resume its normal diameter. In order to increase the resilience of the rods 12, they may be narrowed as at 13, the narrowed portions being disposed with their greater dimension radial, so that the maximum flexibility of each rod will be in a plane substantially tangent to the circle in which the rods are arranged.

In Figure 4 is illustrated an expanding holder adapted for use with this type of chuck. This holder, which is fully described in my co-pending application Serial No. 136,784 filed September 21, 1926, comprises essentially a pair of nuts 14, 15 having conical faces 16, 17 which are opposite to each other and upon which the end members 10, 11 are adapted to engage, the end members being beveled as at 101 to fit on the conical faces. The nuts 14 and 15 are mounted on right and left-handed screw threaded portions 18, 19 of a spindle 20, which may be turned as by a hand wheel 21. By suitable means, such as interengaging lugs and slots formed on the nuts and on a fixed portion of the support, the nuts are held against rotation so that when the spindle 20 is rotated, the nuts simultaneously advance toward each other or move away from each other according to the direction of rotation. The end members 10, 11 riding on the conical faces 16, 17 of the nuts are thus expanded or allowed to retract to their normal diameter by manipulation of the hand wheel 21. Notches may be cut in the end members 10, 11 as at 211 to engage suitable keys or lugs 212 on the nuts 14, 15, thereby preventing rotation of the chuck on the support. In making up chucks of this type, the end plates 10, 11 are preferably stamped from sheet metal. A convenient number of these plates are then held together and drilled by an automatic multiple drill which spaces the holes 22 accurately. This accurate equal spacing of the holes in each circle is important since when the sectors are staggered, each hole should have another opposite to it in the other end piece. In like manner, slots 23 are cut in the bundle of end plates by suitable machinery. The slots 23 are not cut all the way through, but small bridging portions 24 are left to hold the sectors of the plates together while the rods 12 are assembled with them and secured in place. In the outer rims of the end pieces 10 and 11, a series of slight depressions 25 may be cut, if desired, the purpose of these depressions being to afford the chuck a firmer grip on the work without scoring the surface of the work engaged thereby. The holes 22 may be countersunk, if desired, as at 26. The chucks may then be assembled by inserting the ends of the rods 12, which are preferably made with reduced end portions 27, into the holes 22, the sectors of the plates being relatively staggered as previously described. The rods may be secured in place by any suitable means such as spot welding, soldering, peening, or with nuts threaded on the ends. I prefer to secure the rods by spot welds, since such a method is simple, strong and inexpensive, and in addition precludes the possibility of the rods working loose in their holes and turning so as to change the radial position of the thin portions of the rods. This is important since the radial arrangement of the thin portions of the rods is necessary to secure maximum resilience thereof for the expansion of the chuck. When the chuck has been assembled and the rods 12 suitably secured in place, the bridging portions 24 connecting the segments of the end pieces 10, 11 may then be cut through, thus separating the segments and rendering the chuck expansible.

Having thus described an embodiment of my invention, it should be evident to those skilled in the art that many changes and modifications may be made therein without departing from its spirit or scope as defined by the appended claims.

I claim:—

1. An expansible chuck comprising two work-supporting end plates, each said end plate consisting of a plurality of separate parts disposed about an axis, and flexible means connecting the parts of one end plate with parts of the opposite end plate.

2. An expansible chuck comprising two work-supporting end plates, each said plate consisting of a plurality of separate comparatively rigid parts arranged in a closed path about an axis, and means interconnecting all said parts, said interconnecting means comprising a plurality of flexible rods, each rod being fixed at one end to a part of one end plate, and at its other end to a part of the opposite end plate, said rods being spaced radially inwardly from the peripheries of said plates.

3. An expansible chuck comprising two work-supporting end plates consisting of separate comparatively rigid parts arranged about an axis, and means interconnecting said parts, said means comprising a plurality of flexible rods, each rod extending from a part of one end plate to a part of the opposite end plate, and having greater flexibility in one plane than in another, said rods being spaced radially inwardly from the peripheries of said plates.

4. An expansible chuck comprising two end members each said end member consisting of a plurality of separate sector-shaped parts arranged in the general form of a centrally perforated disk, and flexible rods connecting the parts of one end member with the parts of the opposite end member.

5. An expansible chuck comprising two end members, each said end member consisting of a plurality of separate sector-shaped parts arranged in the general form of a centrally perforated disk, and flexible rods joining each said part with two parts of the opposite end member.

6. An expansible chuck comprising two end members, each consisting of separate parts arranged in the general form of a circle, and flexible rods interconnecting said parts, each rod being secured to a part of one end member and to a part of the opposite end member and having different degrees of flexibility in different planes, each rod being so disposed that its maximum flexibility is in a plane substantially perpendicular to a radius of either of said circles passing through said rod.

7. An expansible chuck comprising a pair of centrally perforated end plates disposed in parallel planes, said end plates comprising equal numbers of separate sectors, elongated members extending from one end piece to the other and disposed with their outermost portions nearer to the axis of the chuck than the outer peripheries of said plates, said members normally holding the sectors of each end plate in annular arrangement.

8. An expansible chuck comprising a pair of work-supporting end members disposed in parallel planes, said members being divided into equal numbers of sectors, rods of stiff flexible material connecting said end members and disposed with their outermost peripheries nearer to the axis of the chuck than the outer peripheries of said members, the ends of the rods being fixed to the end members, the arrangement being such that the rods secured to a sector of one end member are secured at their opposite ends to two adjacent sectors of the opposite end member.

9. An expansible chuck comprising a pair of work-supporting end members disposed in parallel planes and divided into separate sectors, and rods joining each said sector with two sectors of the opposite end member, said rods having narrow portions intermediate the ends thereof with the greater cross sectional dimension of the narrow portions arranged radially of the chuck.

10. An expansible chuck comprising two centrally perforated flat metal disks in parallel planes, said disks being divided into separate sectors, and a plurality of resilient metal rods fixed at their ends to said disks each sector having at least two rods fixed thereto, the rods fixed to any sector being fixed to two adjacent sectors of the opposite end member.

11. The method of making an expansible chuck, which comprises forming centrally perforated disks, cutting a series of equally spaced radial slots in said disks, said slots nearly dividing each disk into separate sectors, forming a number of equally spaced holes through said disks, said holes being arranged in a circle, there being a pair of holes through each said sector, securing the end of a rod in each hole, securing the opposite ends of said rods in holes of another disk in such a way that the rods secured to any one sector are secured some to one and some to the other of two sectors of the opposite disk, and completing the severing of the sectors from one another.

12. The method of making expansible chucks, which comprises cutting blanks from sheet metal in the form of centrally perforated disks, cutting radial slots nearly through said disks and thus defining sectors thereof, forming holes through said disks, said holes being disposed in circles concentric with the disk, the holes in each circle being equally spaced from one another, welding the opposite ends of said rods into holes in another disk, the rods and disks being so arranged that the rods attached to each said sector will extend to two sectors of the opposite disk, and severing the sectors from each other.

In testimony whereof I have affixed my signature.

HOWARD PARKER.